United States Patent
Pan

(10) Patent No.: US 11,163,865 B2
(45) Date of Patent: Nov. 2, 2021

(54) TRUSTED COMPUTING METHOD, AND SERVER

(71) Applicant: ADVANCED NEW TECHNOLOGIES CO., LTD., Grand Cayman (KY)

(72) Inventor: Wuqiong Pan, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 17/245,886

(22) Filed: Apr. 30, 2021

(65) Prior Publication Data

US 2021/0256105 A1    Aug. 19, 2021

Related U.S. Application Data

(63) Continuation of application No. PCT/CN2020/074980, filed on Feb. 13, 2020.

(30) Foreign Application Priority Data

Mar. 22, 2019 (CN) .......................... 201910224103.9

(51) Int. Cl.
G06F 21/33 (2013.01)

(52) U.S. Cl.
CPC .................................... *G06F 21/33* (2013.01)

(58) Field of Classification Search
CPC ....................................................... G06F 21/33
(Continued)

(56) References Cited

U.S. PATENT DOCUMENTS 8,213,618 B2    7/2012  Dewan
8,572,692 B2   10/2013  Sunder et al.
(Continued)

FOREIGN PATENT DOCUMENTS

CN    101247410 A    8/2008
CN    101996154 A    3/2011
(Continued)

OTHER PUBLICATIONS

Search Report for Taiwanese Application No. 108134421 dated Sep. 26, 2020.
(Continued)

*Primary Examiner* — Jacob Lipman

(57) ABSTRACT

A trusted computing method applicable in a computer device, a computer device, and a storage medium are provided. The method comprises: during a startup process of the computer device including first and second trusted computing chips, the first trusted computing chip performing a static measurement on the computer device to obtain a static measurement result, and sending the static measurement result to a verification center; and during operations of the computer device after startup of the computer device, the second trusted computing chip performing a dynamic measurement on the computer device to obtain a dynamic measurement result, and sending the dynamic measurement result and association evidence to the verification center, wherein the association evidence indicates that the first and the second trusted computing chips are disposed in the same computer device, and the verification center associates the two measurement results and verifies the integrity of a software system of the computer device.

20 Claims, 2 Drawing Sheets

(58) Field of Classification Search
USPC .......................................................... 726/19
See application file for complete search history.

(56) References Cited

U.S. PATENT DOCUMENTS

| | | | |
|---|---|---|---|
| 8,667,263 B2 | 3/2014 | Challener et al. | |
| 9,230,122 B2 | 1/2016 | Ghose | |
| 9,989,043 B2 | 6/2018 | Lee et al. | |
| 10,778,720 B2 | 9/2020 | Lee et al. | |
| 10,984,108 B2 | 4/2021 | Linton et al. | |
| 2008/0046752 A1* | 2/2008 | Berger | H04L 63/0823 713/186 |
| 2009/0323941 A1 | 12/2009 | Sahita et al. | |
| 2012/0166795 A1 | 6/2012 | Wood et al. | |
| 2015/0358320 A1 | 12/2015 | Shaliv et al. | |
| 2016/0337329 A1 | 11/2016 | Sood et al. | |
| 2020/0110879 A1 | 4/2020 | Linton et al. | |
| 2020/0218821 A1 | 7/2020 | Liu et al. | |
| 2021/0006416 A1 | 1/2021 | Scarlata et al. | |

FOREIGN PATENT DOCUMENTS

| | | |
|---|---|---|
| CN | 102063593 A | 5/2011 |
| CN | 102436566 A | 5/2012 |
| CN | 103501303 A | 1/2014 |
| CN | 104506532 A | 4/2015 |
| CN | 105227319 A | 1/2016 |
| CN | 105306301 A | 2/2016 |
| CN | 105468978 A | 4/2016 |
| CN | 105683982 A | 6/2016 |
| CN | 103841198 B | 3/2017 |
| CN | 106656915 A | 5/2017 |
| CN | 110096887 A | 8/2019 |
| JP | 2018520538 A | 7/2018 |
| KR | 20200085724 A | 7/2020 |
| TW | 201243642 A | 11/2012 |
| WO | 2011078855 A9 | 9/2011 |
| WO | 2020140257 A1 | 7/2020 |

OTHER PUBLICATIONS

Written Opinion of the International Searching Authority and International Search Report for PCT Application No. PCT/CN2020/074980 dated Apr. 20, 2020.
First Search for Chinese Application No. 201910224103.9 dated Apr. 15, 2020.

* cited by examiner

TRUSTED COMPUTING METHOD, AND SERVER

CROSS-REFERENCE TO RELATED APPLICATION

This application is a continuation application of International Patent Application No. PCT/CN2020/074980, filed with the China National Intellectual Property Administration (CNIPA) on Feb. 13, 2020, which is based on and claims priority to and benefits of Chinese Patent Application No. 201910224103.9, filed with the CNIPA on Mar. 22, 2019. The entire content of all of the above-identified applications is incorporated herein by reference.

TECHNICAL FIELD

Embodiments of this specification relate to the field of Internet technologies, and in particular, to a trusted computing method and a server.

BACKGROUND

A trusted computing technology is mainly used for protecting system software from being tampered with by an attacker, and currently is mainly implemented by static measurements. The static measurement is mainly to guarantee the integrity of software during startup of a system, but cannot guarantee the integrity of the software during operations of the system. A dynamic measurement is mainly to guarantee the integrity of software during operations of a system. However, the dynamic measurement has not been really used, resulting in a low reliability of results of trusted computing and a failure to meet the requirements of some high-security scenarios (such as data centers of financial companies).

SUMMARY

According to a trusted computing method and a computer device provided in embodiments of this specification, a technical problem in existing technologies that the reliability of computing results of trusted computing is low when trusted computing is performed on a computer device is resolved. In this way, the embodiments of this specification conduct both a static measurement and a dynamic measurement, and improve the reliability of trusted computing, thereby achieving a technical effect of meeting requirements of high-security scenarios.

According to a first aspect, this specification provides the following technical solution according to an embodiment of this specification.

A trusted computing method is provided, applicable to a computer device, where the computer device is equipped with a first trusted computing chip and a second trusted computing chip, and the method includes:

performing, by the first trusted computing chip, a static measurement on the computer device during startup of the computer device to obtain a static measurement result, and sending the static measurement result to a verification center; and performing, by the second trusted computing chip, a dynamic measurement on the computer device during operations of the computer device after the startup of the computer device to obtain a dynamic measurement result, and sending the dynamic measurement result and association evidence to the verification center, where the association evidence indicates that the first trusted computing chip and the second trusted computing chip are disposed in the same computer device, and the verification center associates the static measurement result with the dynamic measurement result based on the association evidence, generates an associated result, and verifies the integrity of a software system of the computer device based on the associated result.

In an embodiment, the first trusted computing chip is disposed in a serial peripheral interface (SPI) or a low pin count (LPC) interface on the computer device, and the second trusted computing chip is disposed in a peripheral component interconnect express (PCIE) interface, a serial advanced technology attachment (SATA) interface, or a universal serial bus (USB) interface on the computer device.

In an embodiment, before the performing, by the first trusted computing chip, a static measurement on the computer device, the method further includes:

receiving, by the first trusted computing chip, a first device certificate issued by a certificate authority (CA), and receiving, by the second trusted computing chip, a second device certificate issued by the CA, sending, by the first trusted computing chip, the first device certificate to the verification center, for the verification center to verify the first device certificate; and sending, by the second trusted computing chip, the second device certificate to the verification center, for the verification center to verify the second device certificate.

In an embodiment, before the performing, by the first trusted computing chip, a static measurement on the computer device, the method further includes:

receiving, by the second trusted computing chip, the association evidence signed by the CA.

In an embodiment, the association evidence includes:

identification information of the first trusted computing chip;

identification information of the second trusted computing chip; and a signature of the CA.

In an embodiment, the performing, by the first trusted computing chip, a static measurement on the computer device to obtain a static measurement result includes:

acquiring, by the first trusted computing chip, program code of a basic input/output system (BIOS), program code of a Bootloader, and program code of an operating system (OS) that are in the computer device; and generating, by the first trusted computing chip, the static measurement result based on the program code of the BIOS, the program code of the Bootloader, and the program code of the OS.

In an embodiment, the performing, by the second trusted computing chip, a dynamic measurement on the computer device to obtain a dynamic measurement result includes:

acquiring, by the second trusted computing chip, static executable program code of application programs and program code of the application programs in an internal memory during the operations (i.e., when the application programs are running), where the application programs are installed on the computer device; and generating, by the second trusted computing chip, the dynamic measurement result based on the static executable program code of the application programs and the program code of the application programs in the internal memory during the operations.

In an embodiment, after the sending, by the second trusted computing chip, the dynamic measurement result and association evidence to the verification center, the method further includes:

receiving, by the first trusted computing chip, a first verification result returned by the verification center, where the first verification result corresponds to the static measurement; and receiving, by the second trusted computing chip, a second verification result returned by the verification center, where the second verification result corresponds to the dynamic measurement, and the second verification result carries the association evidence.

According to a second aspect, this specification provides the following technical solution according to an embodiment of this specification.

A computer device is provided, including:

a main board;

a first trusted computing chip, disposed on the main board and configured to perform a static measurement on the computer device during startup of the computer device to obtain a static measurement result, and send the static measurement result to a verification center; and a second trusted computing chip, disposed on the main board and configured to perform a dynamic measurement on the computer device during operations of the computer device after the startup of the computer device to obtain a dynamic measurement result, and send the dynamic measurement result and association evidence to the verification center, where the association evidence indicates that the first trusted computing chip and the second trusted computing chip are disposed in the same computer device, and the verification center associates the static measurement result with the dynamic measurement result based on the association evidence, generates an associated result, and verifies the integrity of a software system of the computer device based on the associated result.

In an embodiment, the first trusted computing chip is disposed in a serial peripheral interface (SPI) or a low pin count (LPC) interface on the computer device, and the second trusted computing chip is disposed in a peripheral component interconnect express (PCIE) interface, a serial advanced technology attachment (SATA) interface, or a universal serial bus (USB) interface on the computer device.

In an embodiment, the first trusted computing chip is further configured to:

receive a first device certificate issued by a certificate authority (CA) before performing the static measurement on the computer device; and send the first device certificate to the verification center, for the verification center to verify the first device certificate; and the second trusted computing chip is further configured to:

receive a second device certificate issued by the CA before the first trusted computing chip performs the static measurement on the computer device; and send the second device certificate to the verification center, for the verification center to verify the second device certificate.

In an embodiment, the second trusted computing chip is further configured to:

receive the association evidence signed by the CA before the first trusted computing chip performs the static measurement on the computer device.

In an embodiment, the association evidence includes:

identification information of the first trusted computing chip;

identification information of the second trusted computing chip; and a signature of the CA.

In an embodiment, the first trusted computing chip is configured to:

acquire program code of a basic input/output system (BIOS), program code of a Bootloader, and program code of an operating system (OS) that are in the computer device; and generate the static measurement result based on the program code of the BIOS, the program code of the Bootloader, and the program code of the OS.

In an embodiment, the second trusted computing chip is configured to:

acquire static executable program code of application programs and program code of the application programs in an internal memory during the operations, where the application programs are installed on the computer device; and generate the dynamic measurement result based on the static executable program code of the application programs and the program code of the application programs in the internal memory during the operations.

In an embodiment, the first trusted computing chip is further configured to receive a first verification result returned by the verification center, where the first verification result corresponds to the static measurement.

the second trusted computing chip is further configured to receive a second verification result returned by the verification center, where the second verification result corresponds to the dynamic measurement, and the second verification result carries the association evidence.

According to a third aspect, this specification provides the following technical solution according to an embodiment of this specification.

A non-transitory computer-readable storage medium is provided, configured with instructions executable by a first trusted computing chip and a second trusted computing chip of a computer device to cause the first trusted computing chip and the second trusted computing chip to perform operations comprising: performing, by the first trusted computing chip, a static measurement on a computer device during startup of the computer device to obtain a static measurement result, and send the static measurement result to a verification center; and performing, by the second trusted computing chip, a dynamic measurement on the computer device during operations of the computer device after the startup of the computer device to obtain a dynamic measurement result, and sending the dynamic measurement result and association evidence to the verification center; wherein the association evidence indicates that the first trusted computing chip and the second trusted computing chip are disposed in the same computer device, and the verification center associates the static measurement result with the dynamic measurement result based on the association evidence, generates an associated result, and verifies integrity of a software system of the computer device based on the associated result.

One or more technical solutions provided in the embodiments of this specification have at least the following technical effects or advantages.

An embodiment of this specification discloses a trusted computing method, applicable to a computer device, where the computer device is equipped with a first trusted computing chip and a second trusted computing chip, and the method includes: performing, by the first trusted computing chip, a static measurement on the computer device during startup of the computer device to obtain a static measurement result, and sending the static measurement result to a verification center; and performing, by the second trusted computing chip, a dynamic measurement on the computer device during operations of the computer device after the startup of the computer device to obtain a dynamic measurement result, and sending the dynamic measurement result and association evidence to the verification center, where the association evidence is used for indicating that the first trusted computing chip and the second trusted computing chip are disposed in the same computer device, for the verification center to associate the static measurement result with the dynamic measurement result based on the association evidence, and to verify the integrity of a software system of the computer device based on the associated results. Two associated trusted computing chips are disposed in the computer device, where the first trusted computing chip is configured to perform a static measurement on the computer device, and the second trusted computing chip is configured to perform a dynamic measurement on the computer device; and both the static measurement result and the dynamic measurement result are sent to a verification center. Therefore, the verification center may verify the integrity of a software system of a service computer device based on the static measurement result and the dynamic measurement result. In this way, a technical problem in existing technologies that the reliability of computing results of trusted computing is low when trusted computing is performed on a computer device is resolved. Embodiments of this specification disclose a method that conducts both a static measurement and a dynamic measurement, and improves the reliability of trusted computing, thereby achieving a technical effect of meeting requirements of high-security scenarios.

BRIEF DESCRIPTION OF THE DRAWINGS

To describe the technical solutions in embodiments of this specification more clearly, the following briefly describes accompanying drawings required for describing the embodiments. The accompanying drawings in the following description show some of the embodiments of this specification, and a person of ordinary skill in the art may still derive other drawings from these accompanying drawings without creative efforts.

DETAILED DESCRIPTION

Figure 1:
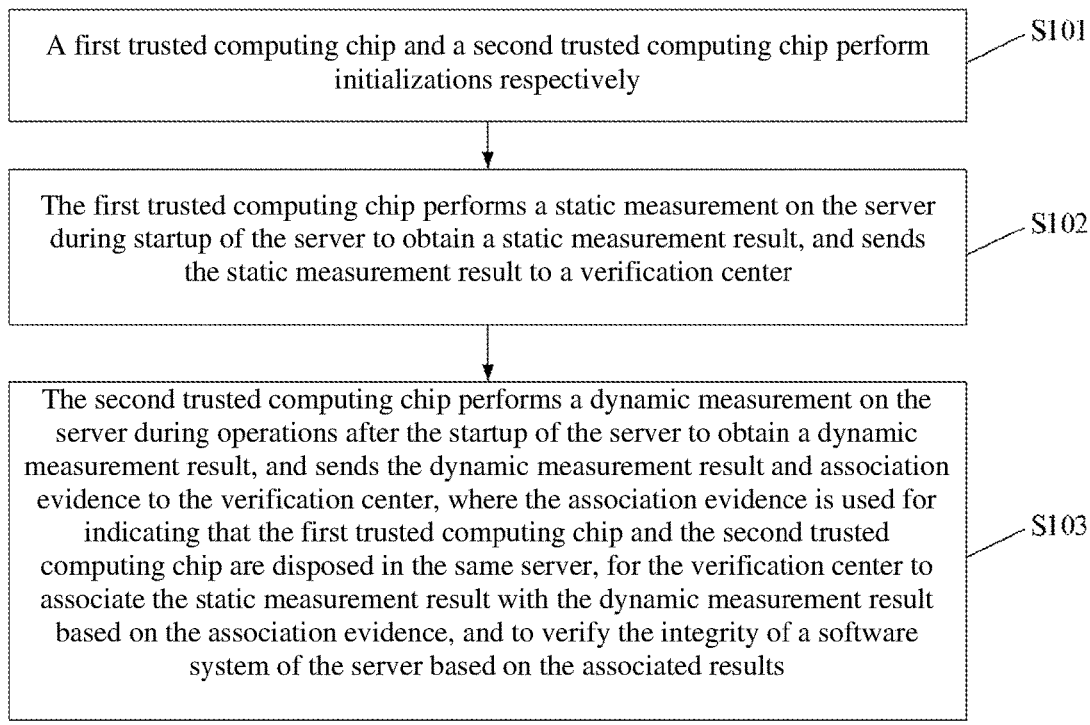
FIG. 1 is a flowchart of a trusted computing method, according to an embodiment of this specification.

Before formally introducing this method, the following is an introduction to existing technologies.

A trusted computing chip is a foundation of trusted computing, and performs the functions of trusted computing together with upper-level verification software. The trusted computing chip is generally called trusted platform module (TPM) or trusted platform control module (TPCM).

A trusted computing technology is mainly used for protecting system software from being tampered with by an attacker, and currently is mainly implemented by static measurements. The static measurement is mainly to guarantee the integrity of software during startup of a system, but cannot guarantee the integrity of the software during operations of the system. A dynamic measurement is mainly to guarantee the integrity of software during operations of a system, but the dynamic measurement has not been really used.

One of reasons is that the dynamic measurement requests high performance. The dynamic measurement usually performs periodically and measures all software each time. However, each existing TPM/TPCM chip is a low-cost and low-performance cryptographic chip and cannot meet the requirements of the dynamic measurement.

Another reason is that each existing TPM/TPCM adopts an interface of SPI. This interface has very low transmission performance and is adopted because only this interface is available in the early stage of the system, and the TPM/TPCM is required to be run in the early stage of the system to verify the integrity of a BIOS. However, the dynamic measurement is required for some high-security scenarios (such as data centers of financial companies). In this case, a high-speed transmission interface is required, but the SPI cannot meet such a requirement.

As a result, the reliability of computing results of trusted computing in existing technologies is low when trusted computing is performed on the server, which cannot meet the requirements of some high-security scenarios (such as data centers of financial companies).

According to a trusted computing method and a server provided in the embodiments of this specification, a technical problem in existing technologies that the reliability of computing results of trusted computing is low when trusted computing is performed on a server is resolved. In this way, this specification conducts both a static measurement and a dynamic measurement, and improves the reliability of trusted computing, thereby achieving a technical effect of meeting requirements of high-security scenarios.

To resolve the foregoing technical problem, a general idea of technical solutions in the embodiments of this specification is as follows.

A trusted computing method applicable to a computer device, such as a server, is provided. A server is used as an example in the description below. A person having ordinary skill in the art should appreciate that the method can be applicable to other computer devices. According to some embodiments, the server is equipped with a first trusted computing chip and a second trusted computing chip. The method includes: performing, by the first trusted computing chip, a static measurement on the server during startup of the server to obtain a static measurement result, and sending the static measurement result to a verification center; and performing, by the second trusted computing chip, a dynamic measurement on the server during operations of the server after the startup of the server to obtain a dynamic measurement result, and sending the dynamic measurement result and association evidence to the verification center, where the association evidence indicates that the first trusted computing chip and the second trusted computing chip are disposed in the same server, and the verification center associates the static measurement result with the dynamic measurement result based on the association evidence, generates an associated result, and verifies the integrity of a software system of the server based on the associated result.

To better understand the foregoing technical solution, the following describes the foregoing technical solution in detail with reference to the accompanying drawings of the specification and specific implementations.

Embodiment 1

This embodiment provides a trusted computing method, applicable to a server, and the server is equipped with both a first trusted computing chip and a second trusted computing chip (that is, has dual roots of trust). The first trusted computing chip is disposed in (e.g., inserted into) an SPI on a main board of the server, the second trusted computing chip is disposed in (e.g., inserted into) a PCIE interface on the main board of the server, and the second trusted computing chip has a better performance than that of the first trusted computing chip.

The SPI is a low-speed interface, and can be used during startup of the server (for example, can be used when the main board is powered on). The first trusted computing chip is inserted into the SPI and may be configured to perform a static measurement on the server. A software environment of the server is simpler during the startup of the server (or may be understood as during the startup of the OS of the server), so that a computing amount required for the static measurement is smaller. Therefore, the TPM/TPCM chip may be used as the first trusted computing chip. Generally, the TPM/TPCM may meet requirements of the static measurement, and is generally low in price to save cost.

In an embodiment, the first trusted computing chip may alternatively be inserted into an LPC interface on the main board of the server. The LPC interface is similar to the SPI and can be used during startup of the server (that is, can be used when the main board is powered on).

The PCIE interface is a high-speed interface and can be used only after the server is started up (that is, can be used only during operations of the server). During the operations of the server after being started up, there are a large quantity of application programs with complex functions on the OS, resulting in a large computing amount required for a dynamic measurement. Therefore, a high-performance security chip (is generally high in price) is used as the second trusted computing chip, and the second trusted computing chip has much better performance than that of the first trusted computing chip. Coordinated with the PCIE high-speed interface, the second trusted computing chip may meet the requirements of the dynamic measurement.

In an embodiment, the second trusted computing chip may alternatively be inserted into a SATA interface or a USB interface on the main board of the server. The SATA interface is also a high-speed interface and may meet requirements of high-speed data transmission.

As shown in FIG. 1, the trusted computing method includes the following steps.

Step S101. The first trusted computing chip and the second trusted computing chip perform initializations, respectively.

For example, when the first trusted computing chip performs the initialization, the first trusted computing chip may receive a first device certificate issued by a CA.

Figure 2:
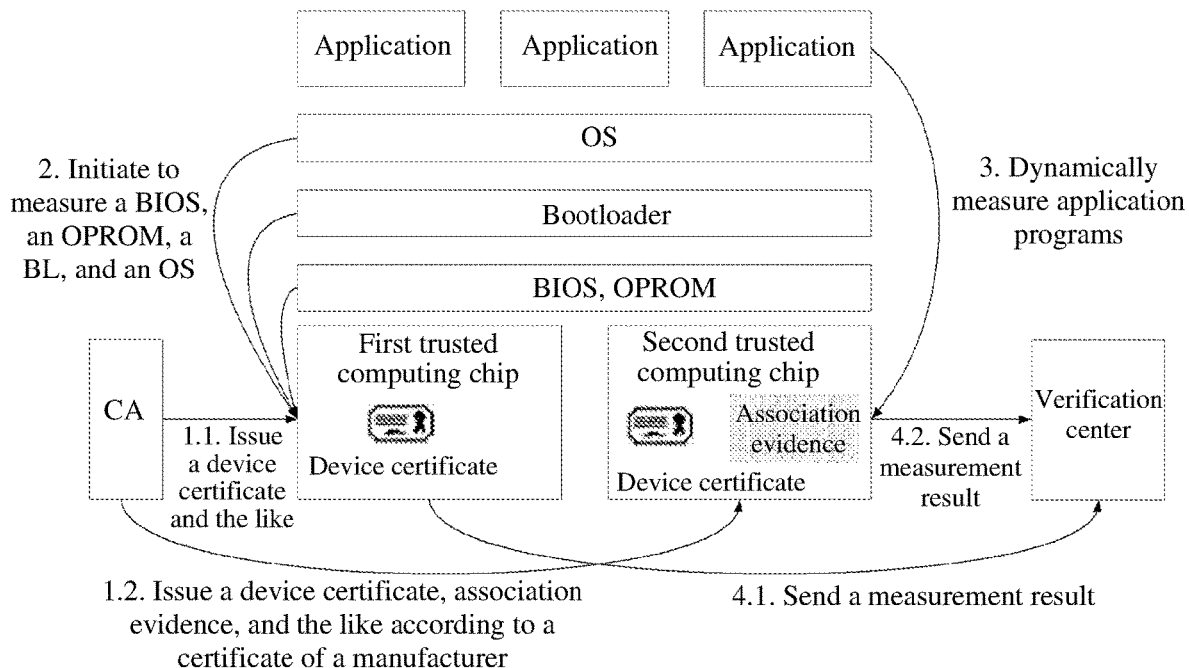
FIG. 2 is a dynamic presentation diagram of a trusted computing method, according to an embodiment of this specification.

In an embodiment, as shown in FIG. 2, before the initialization, the first trusted computing chip may not have a device certificate, or may have a device certificate before leaving the factory. For the sake of security, regardless of whether or not there is an original device certificate in the first trusted computing chip, a new device certificate (that is, the first device certificate) is reissued by the CA during the initialization, and the original device certificate is invalidated. The first device certificate stores a public key corresponding to a private key of the first trusted computing chip. The CA issues the first device certificate to the first trusted computing chip, indicating that the CA approves the validity of the first trusted computing chip.

Similarly, when the second trusted computing chip performs the initialization, the second trusted computing chip may receive a second device certificate issued by the CA.

In an embodiment, before initialization, the second trusted computing chip may not have a device certificate, or may have a device certificate before leaving the factory. For the sake of security, regardless of whether or not there is an original device certificate in the second trusted computing chip, a new device certificate (that is, the second device certificate) is reissued by the CA, and the original device certificate is invalidated. The second device certificate stores a public key corresponding to a private key of the second trusted computing chip. The CA issues the second device certificate to the second trusted computing chip, indicating that the CA approves the validity of the second trusted computing chip.

In an embodiment, the CA may be a server or a server cluster.

In an embodiment, when the first trusted computing chip and the second trusted computing chip need to perform the initialization, the second trusted computing chip further receives association evidence signed by the CA. The association evidence is used for indicating that the first trusted computing chip and the second trusted computing chip are disposed in the same server, and is used for binding the first trusted computing chip and the second trusted computing chip in the same server. The use of the association evidence may prevent an attacker from using measurement results from different hosts to piece together a valid measurement result.

In an embodiment, the association evidence mainly includes identification information (for example, an ID number) of the first trusted computing chip, identification information (for example, an ID number) of the second trusted computing chip, and a signature of the CA.

For example, the CA may perform signing (that is, perform private key encryption) on the ID number of the first trusted computing chip and the ID number of the second trusted computing chip based on a private key (that is, a private key of the CA) to obtain the association evidence.

After the first trusted computing chip and the second trusted computing chip complete the initialization, step S102 may be performed.

Step S102. The first trusted computing chip performs a static measurement on the server during startup of the server to obtain a static measurement result, and sends the static measurement result to a verification center.

Static measurement occurs during the startup, and can ensure the security of the system at the beginning of the startup. The static measurement is mainly performed on code of a BIOS, a Bootloader, and an OS, to detect whether the code has been tampered with. The measurement process is completed along with the startup of the system, and before being run, each part of software is measured by software that calls that part of the software.

In an embodiment, the first trusted computing chip is mainly responsible for acquiring data required for the static measurement and generating the static measurement result.

For example, the first trusted computing chip may acquire program code of a BIOS in the server, program code in an option read-only memory (OPROM) in the server, program code in a Bootloader in the server, and program code of an OS in the server, and generate the static measurement result (including the program code acquired by the first trusted computing chip) based on the program code of the BIOS, the program code in the OPROM, the program code of the Bootloader, and the program code of the OS.

Step S103. The second trusted computing chip performs a dynamic measurement on the server during operations of the server after the startup of the server to obtain a dynamic measurement result, and sends the dynamic measurement result and association evidence to the verification center, where the association evidence is used for indicating that the first trusted computing chip and the second trusted computing chip are disposed in the same server, for the verification center to associate the static measurement result with the dynamic measurement result based on the association evidence, to generate an associated result, and to verify the integrity of a software system of the server based on the associated result.

Dynamic measurement: the dynamic measurement is mainly to ensure the security of the software (or application programs) during the operations after a system is started up, where the software is installed on the OS. The integrity of the system is detected by calling a monitoring system or periodically verifying the code integrity.

In an embodiment, the second trusted computing chip is mainly responsible for acquiring data required for the dynamic measurement and generating the dynamic measurement result.

For example, the second trusted computing chip may acquire static executable program code of application programs and program code of the application programs in an internal memory during the operations, (the "application programs" herein refer to all application programs or a part of designated application programs in the server, and are installed on the OS), and generate the dynamic measurement result (including the program code acquired by the second trusted computing chip) based on the static executable program code of the application programs and the program code of the application programs in the internal memory during the operations.

In an embodiment, the second trusted computing chip may perform a dynamic measurement on the server based on a preset frequency, for example, once every 1 hour, once every 2 hours, once every 6 hours, or the like. The preset frequency may be adjusted freely according to actual requirements, and is not limited herein.

In an embodiment, the verification center may be a server or a server cluster, and be used for verifying the measurement results sent by trusted computing chips (that is, the static measurement result sent by the first trusted computing chip and the dynamic measurement result sent by the second trusted computing chip) and for determining the security of the software (that is, whether the programs are complete or whether the programs have been tampered with).

In an embodiment, after obtaining a static measurement result, the first trusted computing chip may send the static measurement result to the verification center, for the verification center to verify the static measurement result.

For example, the first trusted computing chip may send the static measurement result and the first device certificate to the verification center, for the verification center to perform the security verification. The first device certificate is used for indicating that the first trusted computing chip is a trusted chip approved by the CA. After successively verifying the first device certificate and the static measurement result, the verification center sends a verification result (that is, the first verification result) to the first trusted computing chip, so as to notify the first trusted computing chip of whether the program code of the BIOS, the OPROM, the Bootloader, and the OS is secure (that is, whether the program code is complete or whether the program code has been tampered with).

Similarly, after obtaining a dynamic measurement result each time, the second trusted computing chip may send the dynamic measurement result to the verification center, for the verification center to verify the dynamic measurement result.

For example, the second trusted computing chip may send a dynamic measurement result, a second device certificate, and association evidence to the verification center, for the verification center to perform the security verification. The second device certificate is used for indicating that the second trusted computing chip is a trusted chip approved by the CA. The association evidence is used for indicating that the first trusted computing chip and the second trusted computing chip are in the same server (that is, this dynamic measurement result and the foregoing static measurement result are from the same server). After successively verifying the second device certificate, the association evidence, and the dynamic measurement result, the verification center sends a verification result (that is, the second verification result) to the second trusted computing chip, so as to notify the second trusted computing chip of whether application programs on the server are secure (that is, whether the programs are complete or whether the programs have been tampered with).

In an embodiment, the verification center may associate a static measurement result with a dynamic measurement result from the same server based on the association evidence, and then verify the integrity of a software system of the server based on the associated results.

The verification center may generate a first verification result for the static measurement result and return the first verification result to the first trusted computing chip. In addition, the verification center may generate a second verification result for the dynamic measurement result, add association evidence to the second verification result, and then return the second verification result to the second trusted computing chip. The addition of the association evidence can prove that the first verification result and the second verification result are results obtained by performing the verification for the same server.

In an embodiment, if the server finds that the first verification result indicates that there are insecure factors (for example, whether the programs are incomplete, or the programs have been tampered with) in the program code of the BIOS, the OPROM, the Bootloader, and the OS, first prompt information is outputted to prompt a technician to perform a security check on the server.

Similarly, if the server finds that the second verification result indicates that there are insecure factors (for example, whether the programs are incomplete, or the programs have been tampered with) in the application programs on the server, second prompt information is outputted to prompt a technician to perform a security check on the server.

Further, the server may perform a remote attestation to a remote host. The remote host is a device that has a service connection with the server.

For example, when performing the remote attestation to the remote host, the server may use the private key of the first trusted computing chip to perform signing (that is, perform private key encryption) on the first verification result, and use the private key of the second trusted computing chip to perform signing (that is, perform private key encryption) on the second verification result. The server may package the first verification result, the first device certificate, the second verification result, and the second device certificate and send the package to the remote host. After verifying the validity of the device certificates and the signatures, the remote host may trust the verification results.

In an embodiment, if it is found that the device certificates or the signatures are invalid after verifying the device certificates and the signatures, the remote host may not trust the verification result and reject to provide any service for the server. Alternatively, if it is found that the verification result indicates that the software environment of the server is not secure (that is, the programs are incomplete, or the programs have been tampered with), the remote host may also reject to provide any service for the server.

The technical solution in this embodiment of this specification has at least the following technical effects or advantages.

An embodiment of this specification discloses a trusted computing method, applicable to a server, where the server is equipped with a first trusted computing chip and a second trusted computing chip, and the method includes: performing, by the first trusted computing chip, a static measurement on the server during startup of the server to obtain a static measurement result, and sending the static measurement result to a verification center; and performing, by the second trusted computing chip, a dynamic measurement on the server during operations of the server after the startup of the server to obtain a dynamic measurement result, and sending the dynamic measurement result and association evidence to the verification center, where the association evidence indicates that the first trusted computing chip and the second trusted computing chip are disposed in the same server, and the verification center associates the static measurement result with the dynamic measurement result based on the association evidence, generates an associated result, and verifies the integrity of a software system of the server based on the associated result. Two associated trusted computing chips are disposed in the server, where the first trusted computing chip is configured to perform a static measurement on the server, and the second trusted computing chip is configured to perform a dynamic measurement on the server. Both the static measurement result and the dynamic measurement result are sent to a verification center. Therefore, the verification center may verify the integrity of a software system of a service server based on the static measurement result and the dynamic measurement result. In this way, a technical problem in existing technologies that the reliability of computing results of trusted computing is low when trusted computing is performed on a server is resolved. This specification conducts both a static measurement and a dynamic measurement, and improves the reliability of trusted computing, thereby achieving a technical effect of meeting requirements of high-security scenarios.

Embodiment 2

Figure 3:
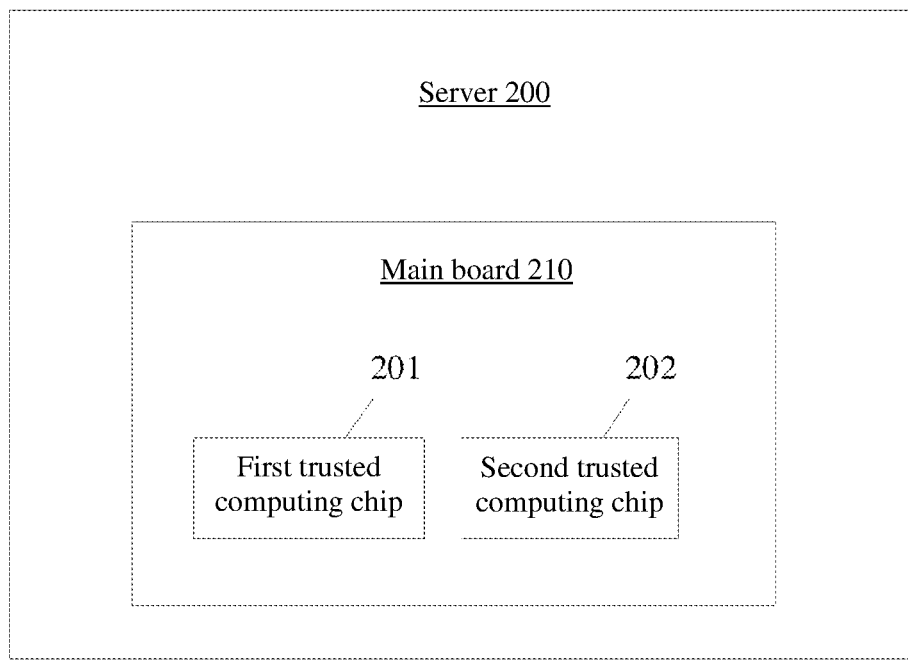
FIG. 3 is a structural diagram of a server, according to an embodiment of this specification.

Based on the same inventive concept, as shown in FIG. 3, this embodiment provides a computer device, for example, a server 200, including:

a main board 210;

a first trusted computing chip 201, disposed on the main board and configured to perform a static measurement on the server during startup of the server to obtain a static measurement result, and send the static measurement result to a verification center; and a second trusted computing chip 202, disposed on the main board and configured to perform a dynamic measurement on the server during operations of the server after the startup of the server to obtain a dynamic measurement result, and send the dynamic measurement result and association evidence to the verification center, where the association evidence is used for indicating that the first trusted computing chip 201 and the second trusted computing chip 202 are disposed in the same server, for the verification center to associate the static measurement result with the dynamic measurement result based on the association evidence, to generate an associated result, and to verify the integrity of a software system of the server based on the associated result.

In an embodiment, the first trusted computing chip 201 is inserted into an SPI or an LPC interface on the server, and the second trusted computing chip 202 is inserted into a PCIE interface, a SATA interface, or a USB interface on the server.

In an embodiment, the first trusted computing chip 201 is further configured to:

perform an initialization, and receive a first device certificate issued by a CA.

In an embodiment, the first trusted computing chip 201 is further configured to:

send the first device certificate to the verification center when sending the static measurement result to the verification center, for the verification center to verify the first device certificate.

In an embodiment, the second trusted computing chip 202 is further configured to:

perform an initialization, and receive a second device certificate issued by the CA.

In an embodiment, the second trusted computing chip 202 is further configured to:

send the second device certificate to the verification center when sending the dynamic measurement result to the verification center, for the verification center to verify the second device certificate.

In an embodiment, the second trusted computing chip 202 is further configured to:

receive the association evidence signed by the CA before the first trusted computing chip 201 performs the static measurement on the server, where the association evidence is used for indicating that the first trusted computing chip 201 and the second trusted computing chip 202 are disposed in the same server.

In an embodiment, the association evidence includes:

identification information of the first trusted computing chip 201;

identification information of the second trusted computing chip 202; and a signature of the CA.

In an embodiment, the first trusted computing chip 201 is configured to:

acquire program code of a basic input/output system (BIOS), program code of a Bootloader, and program code of an operating system (OS) that are in the server; and generate the static measurement result based on the program code of the BIOS, the program code of the Bootloader, and the program code of the OS.

In an embodiment, the second trusted computing chip 202 is configured to:

acquire static executable program code of application programs and program code of the application programs in an internal memory during operations, where the application programs are installed on the server; and generate the dynamic measurement result based on the static executable program code of the application programs and the program code of the application programs in the internal memory during the operation.

In an embodiment, the first trusted computing chip 201 is further configured to:

receive a first verification result returned by the verification center, where the first verification result corresponds to the static measurement.

In an embodiment, the second trusted computing chip 202 is further configured to:

receive a second verification result returned by the verification center, where the second verification result corresponds to the dynamic measurement, and the second verification result carries the association evidence.

The server described in this embodiment is a device adopted to implement a trusted computing method according to embodiments of this specification. Therefore, based on the trusted computing method described in the embodiments of this specification, a person skilled in the art can learn specific implementations of the server in this embodiment and various variations thereof, so details of how the server implements the method in the embodiments of this specification will not be described herein. The specification uses the server as an example. Any device that can be adopted by a person skilled in the art to implement the trusted computing method in the embodiments of this specification shall fall within the protection scope of this specification.

A person skilled in the art should understand that the embodiments of this specification may be provided as a method, a system, or a computer program product. Therefore, the embodiments of this specification may use a form of hardware only embodiments, software only embodiments, or embodiments with a combination of software and hardware. Moreover, the embodiments of this specification may use a form of a computer program product that is implemented on one or more computer-usable storage media (including but not limited to a disk memory, a CD-ROM, an optical memory, and the like) that include computer-usable program code.

The embodiments of this specification are described with reference to the flowcharts and/or block diagrams of a method, a device (system), and a computer program product according to the embodiments of this specification. Computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some of the embodiments of this specification have been described, once a person skilled in the art learns of the basic creative concept, additional changes and modifications may be made to the embodiments. Therefore, the following claims are construed as covering the embodiments and all changes and modifications falling within the scope of the embodiments of this specification.

A person skilled in the art may make various modifications and variations to the embodiments of this specification without departing from the spirit and scope of the embodiments of this specification. In this way, if the modifications and variations of the embodiments of this specification fall within the scope of the claims of the embodiments of this specification and equivalent technologies thereof, the embodiments of this specification also include the changes and variations.

What is claimed is:

1. A trusted computing method, applicable to a computer device, wherein the computer device comprises a first trusted computing chip and a second trusted computing chip, and the method comprises:

performing, by the first trusted computing chip, a static measurement on the computer device during startup of the computer device to obtain a static measurement result, and sending the static measurement result to a verification center; and performing, by the second trusted computing chip, a dynamic measurement on the computer device during operations of the computer device after the startup of the computer device to obtain a dynamic measurement result, and sending the dynamic measurement result and association evidence to the verification center; wherein the association evidence indicates that the first trusted computing chip and the second trusted computing chip are disposed in the same computer device, and the verification center associates the static measurement result with the dynamic measurement result based on the association evidence, generates an associated result, and verifies integrity of a software system of the computer device based on the associated result.

2. The method according to claim 1, wherein the first trusted computing chip is disposed in a serial peripheral interface (SPI) or a low pin count (LPC) interface on the computer device, and the second trusted computing chip is disposed in a peripheral component interconnect express (PCIE) interface, a serial advanced technology attachment (SATA) interface, or a universal serial bus (USB) interface on the computer device.

3. The method according to claim 1, wherein the association evidence comprises:

identification information of the first trusted computing chip;

identification information of the second trusted computing chip; and a signature of a certificate authority (CA).

4. The method according to claim 1, wherein the performing, by the first trusted computing chip, a static measurement on the computer device to obtain a static measurement result comprises:
 acquiring, by the first trusted computing chip, program code of a basic input/output system (BIOS), program code of a Bootloader, and program code of an operating system (OS) that are in the computer device; and
 generating, by the first trusted computing chip, the static measurement result based on the program code of the BIOS, the program code of the Bootloader, and the program code of the OS.

5. The method according to claim 1, wherein the performing, by the second trusted computing chip, a dynamic measurement on the computer device to obtain a dynamic measurement result comprises:
 acquiring, by the second trusted computing chip, static executable program code of application programs and program code of the application programs in an internal memory during the operations, wherein the application programs are installed on the computer device; and
 generating, by the second trusted computing chip, the dynamic measurement result based on the static executable program code of the application programs and the program code of the application programs in the internal memory during the operations.

6. The method according to claim 1, wherein after the sending, by the second trusted computing chip, the dynamic measurement result and association evidence to the verification center, the method further comprises:
 receiving, by the first trusted computing chip, a first verification result returned by the verification center, wherein the first verification result corresponds to the static measurement; and
 receiving, by the second trusted computing chip, a second verification result returned by the verification center, wherein the second verification result corresponds to the dynamic measurement, and the second verification result carries the association evidence.

7. The method according to claim 1, wherein
 before the performing, by the first trusted computing chip, a static measurement on the computer device, the method further comprises: receiving, by the first trusted computing chip, a first device certificate issued by a certificate authority (CA); and receiving, by the second trusted computing chip, a second device certificate issued by the CA,
 the sending the static measurement result to the verification center comprises: sending, by the first trusted computing chip, the first device certificate to the verification center, for the verification center to verify the first device certificate, and
 the sending the dynamic measurement result to the verification center comprises: sending, by the second trusted computing chip, the second device certificate to the verification center, for the verification center to verify the second device certificate.

8. The method according to claim 7, wherein before the performing, by the first trusted computing chip, a static measurement on the computer device, the method further comprises:
 receiving, by the second trusted computing chip, the association evidence signed by the CA.

9. A computer device, comprising:
 a main board;
 a first trusted computing chip, disposed on the main board and configured to perform a static measurement on the computer device during startup of the computer device to obtain a static measurement result, and send the static measurement result to a verification center; and
 a second trusted computing chip, disposed on the main board and configured to perform a dynamic measurement on the computer device during operations of the computer device after the startup of the computer device to obtain a dynamic measurement result, and send the dynamic measurement result and association evidence to the verification center; wherein
 the association evidence indicates that the first trusted computing chip and the second trusted computing chip are disposed in the same computer device, and the verification center associates the static measurement result with the dynamic measurement result based on the association evidence, generates an associated result, and verifies integrity of a software system of the computer device based on the associated result.

10. The computer device according to claim 9, wherein
 the first trusted computing chip is disposed in a serial peripheral interface (SPI) or a low pin count (LPC) interface on the computer device, and
 the second trusted computing chip is disposed in a peripheral component interconnect express (PCIE) interface, a serial advanced technology attachment (SATA) interface, or a universal serial bus (USB) interface on the computer device.

11. The computer device according to claim 9, wherein the association evidence comprises:
 identification information of the first trusted computing chip;
 identification information of the second trusted computing chip; and
 a signature of a certificate authority (CA).

12. The computer device according to claim 9, wherein the first trusted computing chip is further configured to:
 acquire program code of a basic input/output system (BIOS), program code of a Bootloader, and program code of an operating system (OS) that are in the computer device;
 and generate the static measurement result based on the program code of the BIOS, the program code of the Bootloader, and the program code of the OS.

13. The computer device according to claim 9, wherein the second trusted computing chip is further configured to:
 acquire static executable program code of application programs and program code of the application programs in an internal memory during the operations, wherein the application programs are installed on the computer device; and generate the dynamic measurement result based on the static executable program code of the application programs and the program code of the application programs in the internal memory during the operations.

14. The computer device according to claim 9, wherein
 the first trusted computing chip is further configured to: receive a first verification result returned by the verification center, wherein the first verification result corresponds to the static measurement; and
 the second trusted computing chip is further configured to receive a second verification result returned by the verification center, wherein the second verification result corresponds to the dynamic measurement, and the second verification result carries the association evidence.

15. The computer device according to claim 9, wherein the first trusted computing chip is further configured to:
  receive a first device certificate issued by a certificate authority (CA) before performing the static measurement on the computer device; and send the first device certificate to the verification center, for the verification center to verify the first device certificate; and
the second trusted computing chip is further configured to:
  receive a second device certificate issued by the CA before the first trusted computing chip performs the static measurement on the computer device; and send the second device certificate to the verification center, for the verification center to verify the second device certificate.

16. The computer device according to claim 15, wherein the second trusted computing chip is further configured to:
  receive the association evidence signed by the CA before the first trusted computing chip performs the static measurement on the computer device.

17. A non-transitory computer-readable storage medium, configured with instructions executable by a first trusted computing chip and a second trusted computing chip of a computer device to cause the first trusted computing chip and the second trusted computing chip to perform operations comprising:
  performing, by the first trusted computing chip, a static measurement on a computer device during startup of the computer device to obtain a static measurement result, and send the static measurement result to a verification center; and
  performing, by the second trusted computing chip, a dynamic measurement on the computer device during operations of the computer device after the startup of the computer device to obtain a dynamic measurement result, and sending the dynamic measurement result and association evidence to the verification center; wherein
  the association evidence indicates that the first trusted computing chip and the second trusted computing chip are disposed in the same computer device, and the verification center associates the static measurement result with the dynamic measurement result based on the association evidence, generates an associated result, and verifies integrity of a software system of the computer device based on the associated result.

18. The non-transitory computer-readable storage medium according to claim 17, wherein the operations further comprise:
  receiving, by the first trusted computing chip, a first device certificate issued by a certificate authority (CA) before performing the static measurement on the computer device, and sending the first device certificate to the verification center, for the verification center to verify the first device certificate; and
  receiving, by the second trusted computing chip, a second device certificate issued by the CA before the first trusted computing chip performs the static measurement on the computer device, and sending the second device certificate to the verification center, for the verification center to verify the second device certificate.

19. The non-transitory computer-readable storage medium according to claim 17, wherein the performing, by the first trusted computing chip, a static measurement on the computer device to obtain a static measurement result comprises:
  acquiring program code of a basic input/output system (BIOS), program code of a Bootloader, and program code of an operating system (OS) that are in the computer device; and
  generating the static measurement result based on the program code of the BIOS, the program code of the Bootloader, and the program code of the OS.

20. The non-transitory computer-readable storage medium according to claim 17, wherein the performing, by the second trusted computing chip, a dynamic measurement on the computer device to obtain a dynamic measurement result comprises:
  acquiring static executable program code of application programs and program code of the application programs in an internal memory during the operations, wherein the application programs are installed on the computer device; and
  generating the dynamic measurement result based on the static executable program code of the application programs and the program code of the application programs in the internal memory during the operations.

* * * * *